US010518223B2

(12) United States Patent
Hill et al.

(10) Patent No.: US 10,518,223 B2
(45) Date of Patent: Dec. 31, 2019

(54) CHLORINE RESISTANT POLYELECTROLYTE MULTILAYER MEMBRANES FOR DESALINATION

(71) Applicants: THE UNIVERSITY OF MELBOURNE, Victoria (AU); COMMONWEALTH SCIENTIFIC AND INDUSTRIAL RESEARCH ORGANISATION, Campbell (AU)

(72) Inventors: Anita Hill, Clayton (AU); Kwun Lun Cho, Melbourne (AU); Francesco Caruso, Melbourne (AU); Sandra Elizabeth Kentish, Melbourne (AU)

(73) Assignees: COMMONWEALTH SCIENTIFIC AND INDUSTRIAL RESEARCH ORGANISATION, Acton, Act (AU); THE UNIVERSITY OF MELBOURNE, Victoria (AU)

( * ) Notice: Subject to any disclaimer, the term of this patent is extended or adjusted under 35 U.S.C. 154(b) by 196 days.

(21) Appl. No.: 15/550,560

(22) PCT Filed: Feb. 10, 2016

(86) PCT No.: PCT/AU2016/050080
§ 371 (c)(1),
(2) Date: Aug. 11, 2017

(87) PCT Pub. No.: WO2016/127212
PCT Pub. Date: Aug. 18, 2016

(65) Prior Publication Data
US 2018/0036687 A1    Feb. 8, 2018

(30) Foreign Application Priority Data
Feb. 11, 2015 (AU) ................. 2015900431

(51) Int. Cl.
*B01D 69/02* (2006.01)
*B01D 69/12* (2006.01)
(Continued)

(52) U.S. Cl.
CPC ............. *B01D 69/02* (2013.01); *B01D 69/12* (2013.01); *B01D 71/68* (2013.01); *C02F 1/44* (2013.01);
(Continued)

(58) Field of Classification Search
CPC ............ B01D 2323/30; B01D 2325/14; B01D 2325/16; B01D 61/025; B01D 69/02;
(Continued)

(56) References Cited

U.S. PATENT DOCUMENTS 8,455,557 B2    6/2013  Linder et al.
2002/0039648 A1  4/2002  Horpel et al.
2014/0054221 A1  2/2014  Agnihotri et al.

OTHER PUBLICATIONS

Junwoo Park, Jeongju Park, Sung Hyun Kim, Jinhan Cho and Joona Bang; Desalination membranes from pH-controlled and thermally-crosslinked layer-by-layer assembled multilayers; J. Mater. Chem., 2010, 20, 2085-2091. (Year: 2010).*
(Continued)

*Primary Examiner* — Pranav N Patel
(74) *Attorney, Agent, or Firm* — Kilpatrick Townsend & Stockton LLP

(57) ABSTRACT

The present invention relates to chlorine resistant polyelectrolyte multilayer membranes which can be used as reverse osmosis, forward osmosis or nanofiltration membranes for applications such as desalination and water purification and methods of making membranes of this type.

19 Claims, 6 Drawing Sheets

(51) Int. Cl.
    *B01D 71/68*     (2006.01)
    *C02F 1/44*     (2006.01)
    *B01D 61/02*     (2006.01)
    *B01D 71/60*     (2006.01)

(52) U.S. Cl.
    CPC ............ *B01D 61/025* (2013.01); *B01D 71/60* (2013.01); *B01D 2323/30* (2013.01); *B01D 2325/14* (2013.01); *B01D 2325/16* (2013.01); *C02F 1/441* (2013.01); *C02F 1/442* (2013.01); *C02F 1/445* (2013.01)

(58) Field of Classification Search
    CPC ........ B01D 69/12; B01D 71/60; B01D 71/68; C02F 1/44; C02F 1/441; C02F 1/442; C02F 1/445; Y02A 20/131
    See application file for complete search history.

(56) References Cited

OTHER PUBLICATIONS

F. Lufrano, G. Squadrito, A. Patti, E. Passalacqua; Sulfonated Polysulfone as Promising Membranes for Polymer Electrolyte Fuel Cells; Journal of Applied Polymer Science, vol. 77, 1250-1257 (2000). (Year: 2000).*

Brian W. Stanton, Jeremy J. Harris, Matthew D. Miller, and Merlin L. Bruening; Ultrathin, Multilayered Polyelectrolyte Films as Nanofiltration Membranes; Langmuir 2003, 19, 7038-7042. (Year: 2003).*

International Application No. PCT/AU2016/050080, Search Report dated May 6, 2016.

International Application No. PCT/AU2016/050080, Written Opinion dated May 6, 2016.

International Application No. PCT/AU2016/050080, International Preliminary Report on Patentability dated Aug. 15, 2017, 6 pages.

* cited by examiner

CHLORINE RESISTANT POLYELECTROLYTE MULTILAYER MEMBRANES FOR DESALINATION

CROSS REFERENCE TO RELATED APPLICATION

This application claims priority to Australian Application No. 2015900431, filed Feb. 11, 2015, the disclosures of which are hereby incorporated by reference herein in their entireties.

TECHNICAL FIELD

The present invention relates to chlorine resistant polyelectrolyte multilayer membranes which can be used as membranes for applications such as desalination and water purification and methods of making membranes of this type. The membranes comprise a water permeable charged substrate with a number of polyelectrolyte bilayers deposited on at least one side of the substrate to form a polyelectrolyte multilayer membrane. The invention also relates to the use of membranes of this type in methods of water purification.

BACKGROUND OF INVENTION

The availability of fresh water for drinking, irrigation and industrial applications is a critical issue facing the world given the impacts of climate change and the growing world population. The growth in world population coupled with greater environmental pollution has placed great strain on the availability of suitable amounts of fresh water and efforts have been made to improve the production of fresh water of this type.

As a result of these challenges significant research effort has been put into water purification technology such as desalination technology which can be applied to the purification of brackish ground water such as bore water and also to water obtained from oceans (salt water). One approach to the production of clean water involves using membrane technology which has been demonstrated as an economical and an energy efficient alternative to current technologies such as thermal distillation. The most commonly used membranes for desalination are thin film composite membranes (TFC) consisting of an active polyamide layer, which provides ion selectivity, deposited onto a porous support such as a polysulfone. The polyamide layer is fabricated through the rapid reaction between an aromatic di-functional amine and a tri-functional acid chloride, producing a negatively charged and heavily cross-linked film, which are the key properties leading to its high salt rejection performance. These membranes can be used in reverse osmosis, nanofiltration and forward osmosis applications.

The major drawback of the polyamide systems of this type is that the membranes are not tolerant to oxidizing agents such as chlorine. Water treatment systems are also susceptible to fouling by biological species and the current method of inhibiting such fouling involves the chlorination of the feed water supply. Unfortunately, the exposure of polyamide membranes to aqueous chlorine has been shown to cause degradation of the aromatic amide bonds, rapidly compromising membrane integrity. As a result most commercial membrane manufacturers recommend a near-zero exposure of the polyamide membranes to chlorinating agents to prolong membrane lifespan. Current solutions to this issue involve the chlorination of feed water to eliminate fouling species followed by de-chlorination upstream of the membrane system. Purified water is then re-chlorinated downstream for distribution to its point of use. The development of desalination membranes that are chlorine resistant would eliminate these additional processing steps, dramatically reducing operating costs.

One attractive approach to the formation of membranes of this type is the layer-by-layer (LbL) assembly of polyelectrolytes which allows for the fabrication of separation membranes whereby a wide range of polymers can be readily deposited in aqueous media with a high level of control of properties such as membrane porosity, layer thickness and composition. These polyelectrolyte multilayer (PEM) membranes have been studied extensively for nanofiltration, forward osmosis and ion selection. Unfortunately to date this methodology has not proven successful as the low rejection of monovalent ions has been a challenge for the use of PEM membranes in reverse osmosis (RO) and forward osmosis (FO) applications. Nevertheless this synthetic technique is attractive due to its relative simplicity which allows for the rapid and flexible synthesis of a wide variety of membrane materials.

Accordingly it would be desirable provide improved membrane materials that could be fabricated using LbL assembly techniques that could be used for applications of this type as it would be expected that they would find widespread application in water purification.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed in Australia or elsewhere before the priority date of each claim of this application.

SUMMARY OF INVENTION

In one aspect the present invention provides a membrane for reverse osmosis, forward osmosis or nanofiltration comprising (a) a water permeable charged substrate and (b) a plurality of polyelectrolyte bilayers deposited on at least one side of the substrate, each polyelectrolyte bilayer comprising a layer of a cationic polyelectrolyte material and a layer of an anionic polyelectrolyte material wherein the anionic polyelectrolyte material is sulfonated polysulfone. The applicants have found that a membrane of this type has interesting membrane properties both from a separation sense and in the sense that the membrane is resistant to degradation by chlorine.

In yet an even further aspect the present invention provides a method of forming a membrane, the method comprising the steps of:
(a) providing a charged substrate;
(b) depositing a plurality of polyelectrolyte bilayers on at least one side of the charged substrate, each polyelectrolyte bilayer comprising a layer of a cationic polyelectrolyte material and a layer of an anionic polyelectrolyte material wherein the anionic polyelectrolyte material is a sulfonated polysulfone.

The method of the present invention is relatively rapid and allows for the ready formation of a membrane in a controlled fashion as the number of layers in the membrane can be readily controlled which in turn provides control over the membrane thickness, performance and the like.

In yet an even further aspect the present invention provides a method of treating water to increase its purity using the membrane of the invention. In one aspect the method comprises providing a feed stream of water to be treated and contacting a membrane of the invention with the feed stream to produce a permeate stream and a retentate stream wherein the permeate stream has a higher level of purity than the feed stream.

DETAILED DESCRIPTION

Figure 1:
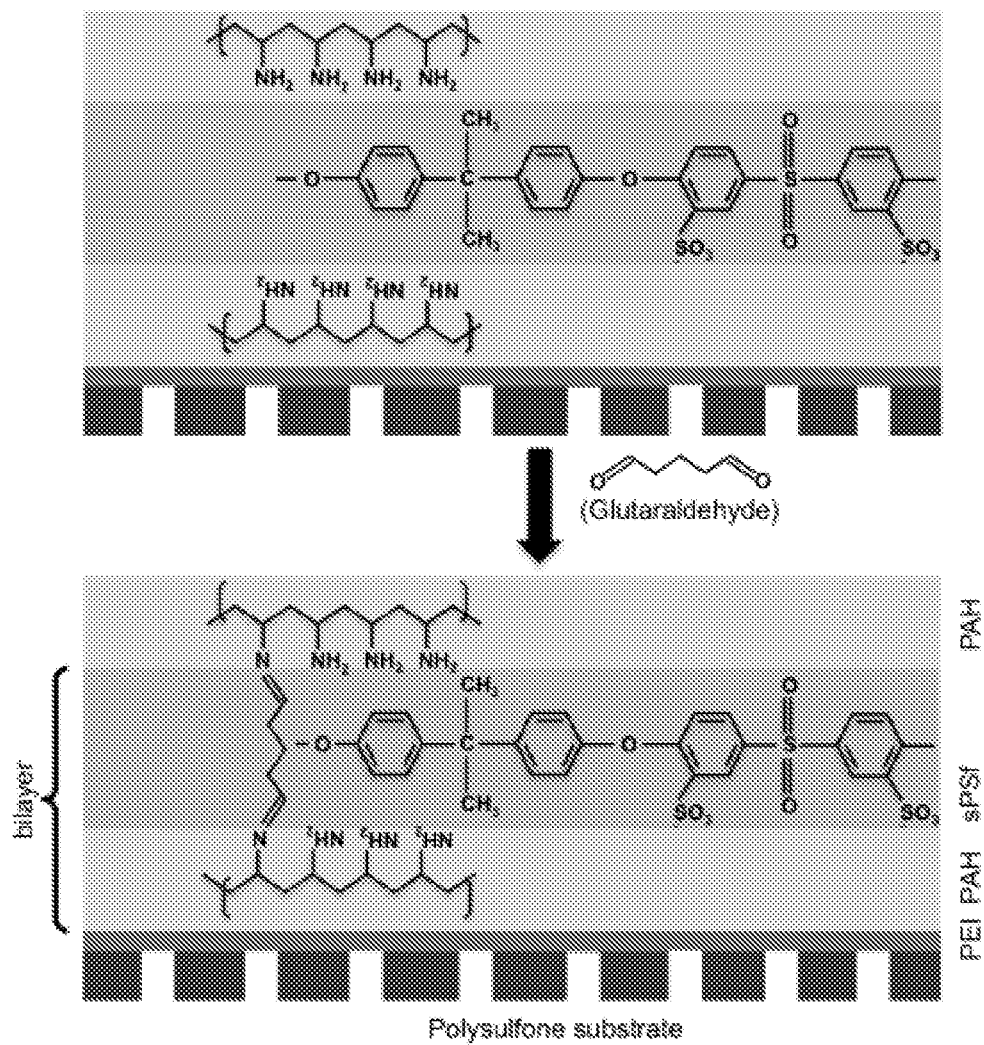
FIG. 1 shows a schematic illustration of a polyelectrolyte material with a sulfonated polysulfone both before (upper) and after (lower) glutaraldehyde cross-linking.
Figure 2A:
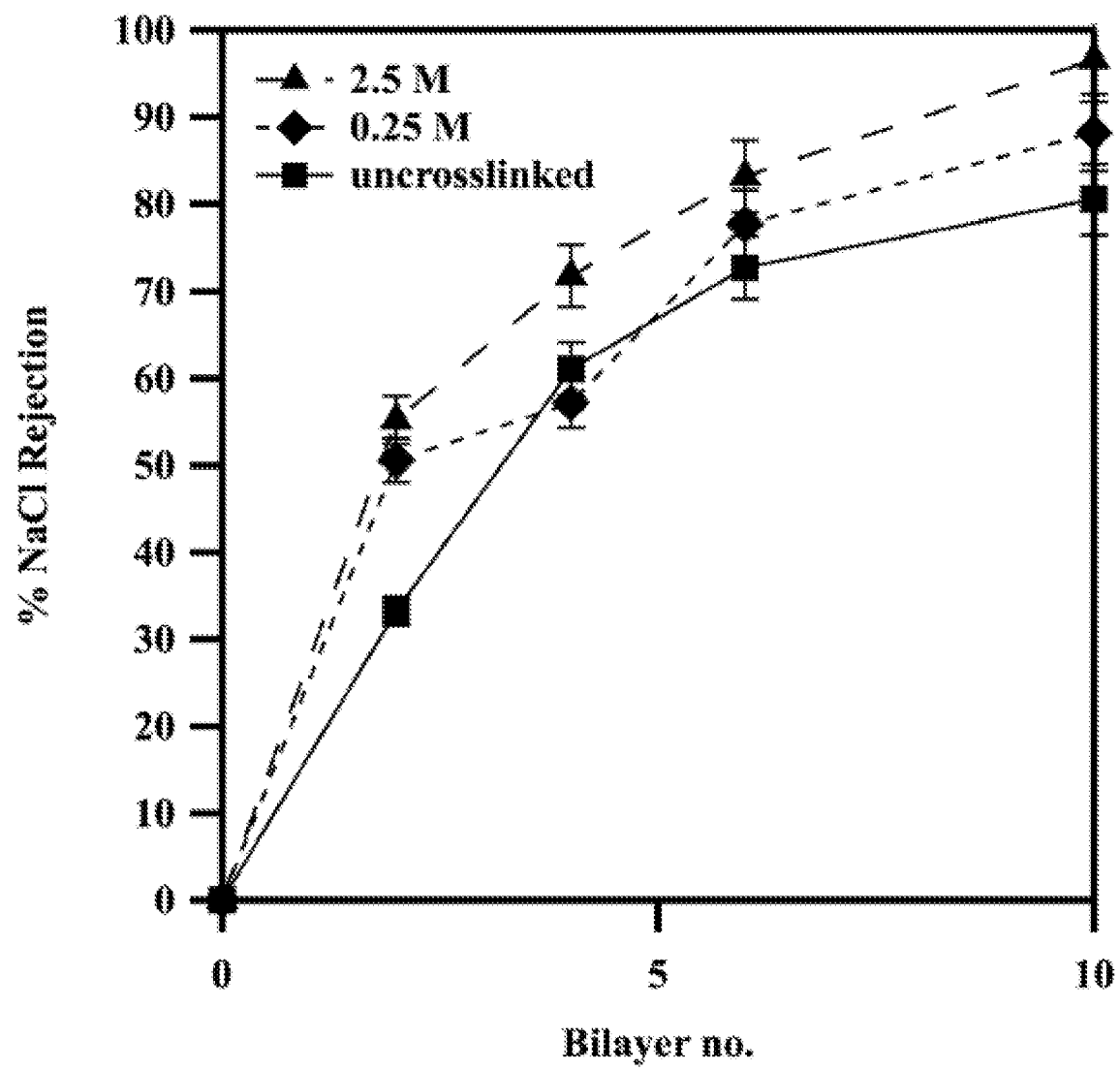
FIG. 2a shows NaCl rejection of a sPSf/PAH membrane at various crosslinker concentrations as a function of bilayer number.
Figure 2B:
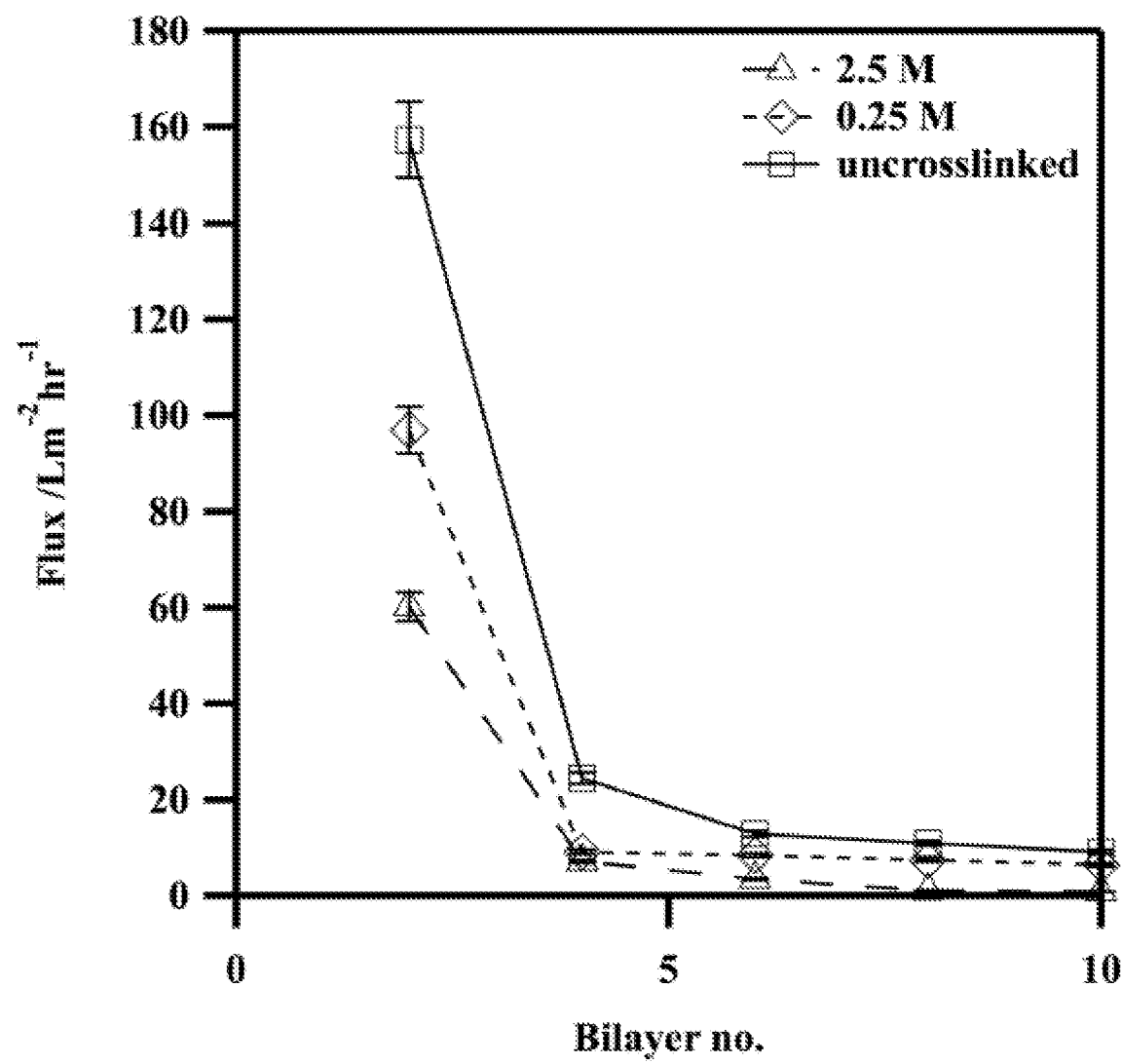
FIG. 2b shows flux of a sPSf/PAH membrane at various crosslinker concentrations as a function of bilayer number.
Figure 2C:
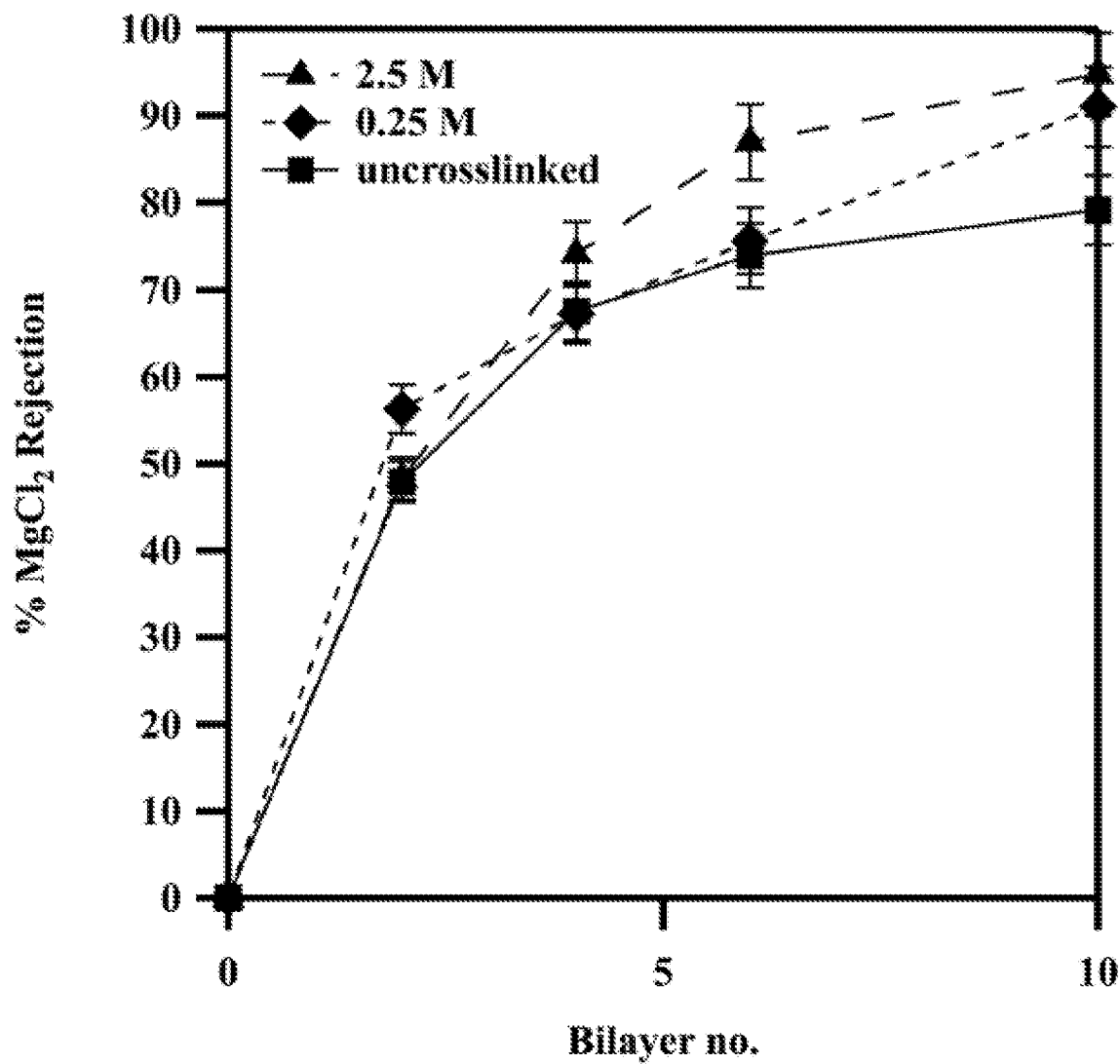
FIG. 2c shows $MgCl_2$ rejection of a sPSf/PAH membrane at various crosslinker concentrations as a function of bilayer number.
Figure 3A:
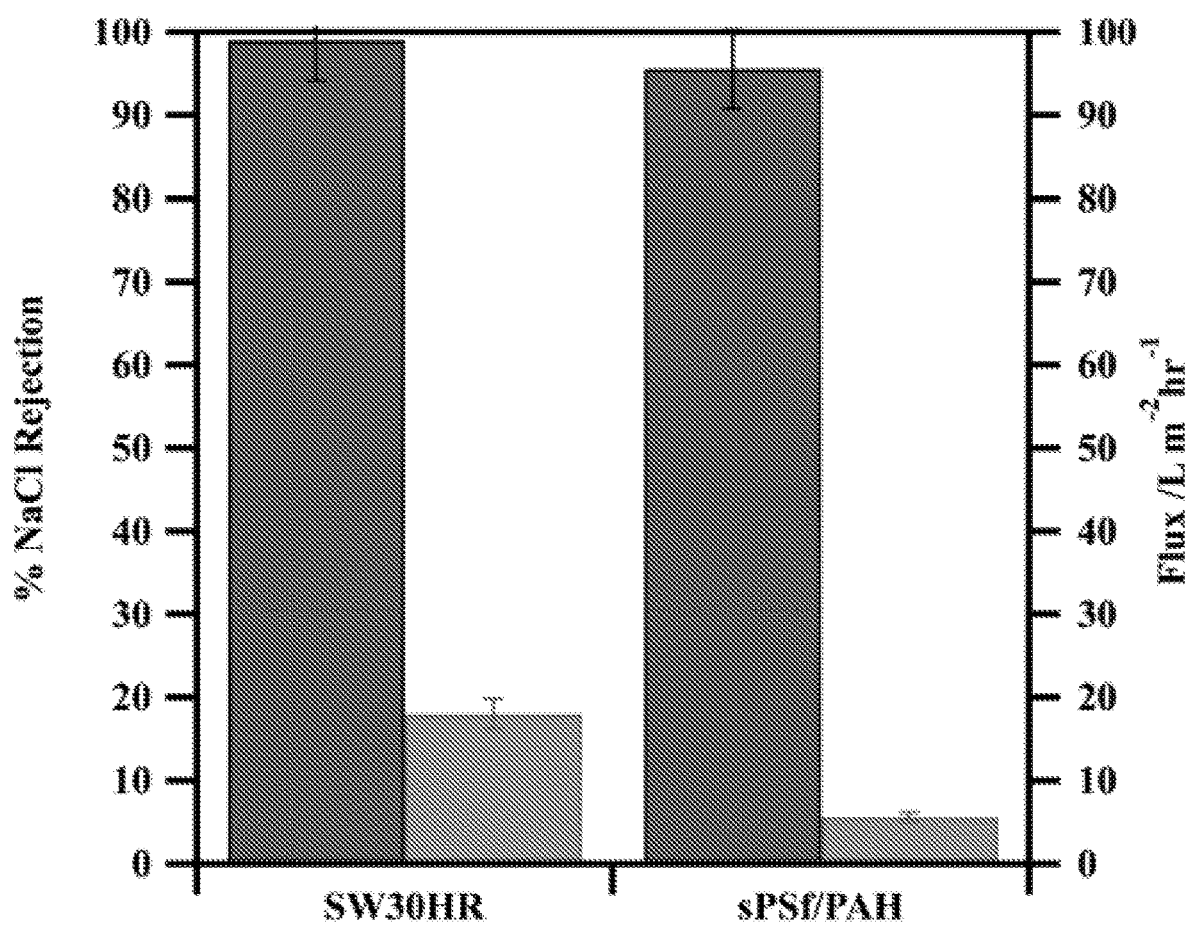
FIG. 3a shows NaCl rejection and flux of a sPSf/PAH membrane in comparison to commercial SW30HR membrane.
Figure 3B:
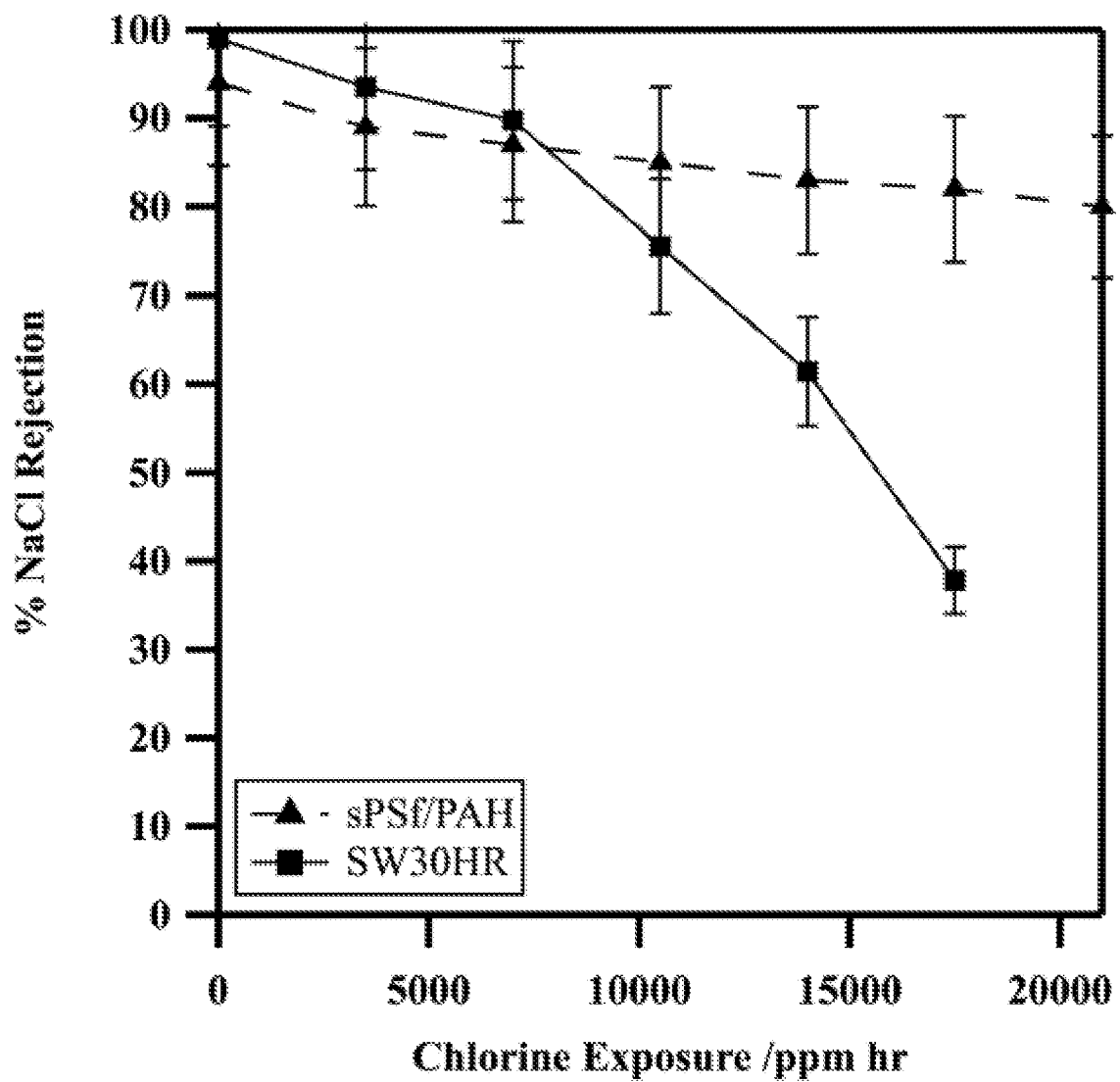
FIG. 3b shows NaCl rejection as a function of chlorine exposure time in comparison to commercial SW30HR membrane.

As stated above the present invention provides a membrane comprising (a) a water permeable charged substrate and (b) a plurality of polyelectrolyte bilayers deposited on at least one side of the charged substrate, each polyelectrolyte bilayer comprising a layer of a cationic polyelectrolyte material and a layer of an anionic polyelectrolyte material wherein the anionic polyelectrolyte material is sulfonated polysulfone.

The substrate used in the membranes of the present invention may be selected from a wide variety of suitable substrates with the only requirement being that the substrate be water permeable given the intended end use application of the membrane once formed. A wide variety of polymers may be used as or in the formation of the substrate to be incorporated into the membrane of the present invention. Whilst the final substrate must be a charged substrate in order to allow deposition of the polyelectrolyte layers in the formation of the bilayers the initial substrate precursor may be either a charged material (such as a charged polymer) or a neutral material (such as a neutral polymer). Examples of negatively charged polymers that may be used as the substrate include sulfonated polysulfone, sulfonated polyether sulfone, sulfonated polystyrene and the like. Examples of positively charges polymers that may be used include polyetherimide for example.

The substrate precursor may also be a neutral polymer that has been surface treated either physically or chemically to produce a substrate having a charged surface suitable for deposition of the polyelectrolyte materials in the formation of the bilayers. For example a negatively charged substrate can be produced by treating polyacrylonitrile with strong base. In a similar fashion a neutral polymer like polysulfone may be treated with polyethylene imine to produce a charged substrate with positively charged surface residues. A skilled addressee in the art would readily be able to modify a suitable base substrate to produce either a negatively or positively charged substrate depending on which polyelectrolyte layer (anionic or cationic) is desired to be first deposited. If the first polyelectrolyte layer to be deposited is a cationic polyelectrolyte layer then it is desirable that the charged substrate be a negatively charged substrate. If the first polyelectrolyte layer to be deposited is an anionic polyelectrolyte layer then the charged substrate must be a positively charged substrate. A particularly suitable substrate is a polyethyleneimine treated porous polysulfone material.

The membranes of the present invention comprise a plurality of polyelectrolyte bilayers deposited on at least one side of the charged substrate, each polyelectrolyte bilayer comprising a layer of a cationic polyelectrolyte material and a layer of an anionic polyelectrolyte material wherein the anionic polyelectrolyte material is sulfonated polysulfone.

The cationic polyelectrolyte material may be selected from a wide range of cationic polyelectrolyte materials. Examples of suitable cationic polyelectrolyte materials include Poly(acrylamide-co-diallyldimethyl ammonium chloride), Poly(allylamine hydrochloride), and Poly(diallyldimethylammonium chloride). In one embodiment the cationic polyelectrolyte material is Poly(acrylamide-co-diallyldimethyl ammonium chloride). In one embodiment the cationic polyelectrolyte material is Poly(allylamine hydrochloride). In one embodiment the cationic polyelectrolyte material is Poly(diallyldimethylammonium chloride). In principle any amine functionalise polymer could be used as the cationic polyelectrolyte material.

The cationic polyelectrolyte material may be any number of suitable molecular weights with the exact molecular weight determined by the final properties in the membrane. Examples of suitable molecular weights include about 15000, about 58000 and about 70000.

The anionic polyelectrolyte material used in the present invention is a sulfonated polysulfone. A typical polysulfone is produced by reaction of a diphenol with bis(4-chlorophenyl) sulfone to form a polyether with elimination of sodium chloride. The structure of the repeat unit of the most widely used polysulfone is provided below:

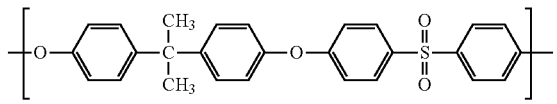

Any suitable sulfonated polysulfone may be used in the present invention. Examples includes polysulfones containing 1, 2, 3 or 4 sulfate groups per repeat unit of the polymer.

In one embodiment the sulfonated polysulfone is synthesised by the condensation polymerisation of a 3,3-disulfonated-4,4-dichlorodiphenyl sulfone (SDCDPS) with a diphenol. The sulfonated monomer is synthesised by the sulfonation of 4,4-dichlorodiphenyl sulfone (DCDPS) using fuming sulfuric acid. This leads to the formation of a sulfonated monomer of the following structure:

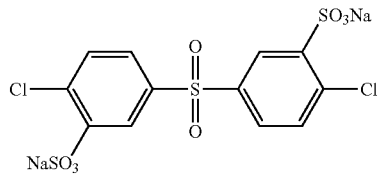

Polymerisation of the sulfonated monomers, as opposed to post-sulfonation of the polymer allows for much greater control of the degree of sulfonation in the final polymer, which can be adjusted by varying the amount of sulfonated (SDCDPS) and unsulfonated (DCDPS) monomers in the polymerisation mixture.

The membranes of the present invention may contain any number of bilayers of polyelectrolyte material. In one embodiment the membrane comprises 3 bilayers. In one embodiment the membrane comprises 5 bilayers. In one embodiment the membrane comprises 10 bilayers.

Depending upon the end use application there may be crosslinking between the bilayers to increase the structural integrity of the membrane. The cross linking may be carried out in any way known in the art. In one embodiment the cationic polyelectrolyte material in one bilayer is cross linked to the cationic polyelectrolyte material in an adjacent bilayer.

The crosslinking of cationic polyelectrolyte layers may be carried out in a number of ways well known in the art and takes advantage of the pendant positively charged residues on the surface of the cationic polyelectrolyte material. For example if the surface residue is a pendant amino group (as found for example in PAH) then a suitable cross linking moiety is a di-aldehyde such as glutaraldehyde.

In addition to the membrane of the invention described above the present invention also provides a method of forming a membrane, the method comprising the steps of:
(a) providing a charged substrate;
(b) depositing a polyelectrolyte bilayer on at least one side of the substrate, each polyelectrolyte bilayer comprising a layer of a cationic polyelectrolyte material and a layer of an anionic polyelectrolyte wherein the anionic polyelectrolyte is sulfonated polysulfone.

As can be seen the first step in the process is the step of providing a charged substrate. A large number of suitable substrates may be used as the charged substrate as discussed above. Once the charged substrate has been provided the process involves the deposition of one or more polyelectrolyte bilayers on the substrate. The order of deposition of the layers of cationic polyelectrolyte material and anionic polyelectrolyte material will depend on the nature of the charged substrate. As discussed above if the substrate is a negatively charged substrate then the cationic polyelectrolyte material is deposited first followed by the anionic polyelectrolyte material. If the charged substrate is a positively charged substrate then the anionic polyelectrolyte material is deposited first. A skilled worked in the field will be readily able to determine the polyelectrolyte material to be first deposited depending upon the nature of the charged substrate.

Accordingly in some embodiments the step of depositing a polyelectrolyte bilayer on at least one side of the charged substrate comprises the steps of:
(b1) depositing a layer of cationic polyelectrolyte material;
(b2) washing the deposited layer;
(b3) depositing a layer of anionic polyelectrolyte material, wherein the anionic polyelectrolyte material is sulfonated polysulfone; and
(b4) washing the deposited layer.

In yet an even further embodiment the step of depositing a polyelectrolyte bilayer on at least one side of the charged substrate comprises the steps of:
(b1) depositing a layer of anionic polyelectrolyte material, wherein the anionic polyelectrolyte material is a sulfonated polysulfone;
(b2) washing the deposited layer;
(b3) depositing a layer of cationic polyelectrolyte material;
(b4) washing the deposited layer.

The layers of material may be deposited in any of a number of ways known in the art of LbL layer formation. Thus, for example, the charged substrate may be dipped into a solution containing the polyelectrolyte material for a period of time sufficient to allow deposition of the polyelectrolyte material onto the substrate. Alternatively a solution containing the polyelectrolyte material may be sprayed onto the surface to form a layer on the surface. In each of these embodiments the concentration of polyelectrolyte material in solution may vary greatly. Nevertheless for completeness it is noted that a concentration of 1 mg/ml is suitable.

After deposition of each layer the surface may be washed to reduce contamination between the layers and to increase membrane structural integrity. A skilled addressee would understand that a number of solvents may be used to wash the surface. A particularly suitable solvent is water.

The step of depositing a polyelectrolyte bilayer may be carried out any number of times to produce a membrane having the desired number of bilayers in the final membrane. A skilled worker in the art can readily determine the number of times that the step should be repeated depending upon the number of layers required.

Once the suitable number of bilayers of polyelectrolyte material have been deposited the membrane may be further treated to modify its structural characteristics. For example a capping layer may be applied to provide a functional surface layer to the membrane. This capping layer may reduce abrasion or fouling of the membrane surface.

In certain embodiments the membrane is subjected to conditions suitable to form cross links between layers within the material. In one embodiment the membrane is treated to crosslink the cationic polyelectrolyte material in at least one bilayer to the cationic polyelectrolyte material in an adjacent bilayer. On one embodiment this is achieved by reacting the membrane with a suitable cross linking agent. In one embodiment the cross linking agent is glutaraldehyde.

As stated above the membranes of the present invention find application in water purification. Accordingly the membranes of the present invention may be used in methods for treating water to increase its purity. There are a number of ways in which membranes of this type may be used in water purification as would be appreciated by a skilled worker in the art.

In one embodiment the method comprises providing a feed stream of water to be treated and contacting a membrane of the invention with the feed stream to produce a permeate stream and a retentate stream wherein the permeate stream has a higher level of purity than the feed stream. The water to be treated may be any suitable water that is required to be treated. Examples of water that may be treated in the method of the invention include saline water, brackish water, ground water, fresh water, recycled water, waste water and combinations thereof. In one embodiment the water to be treated is saline water. In one embodiment the water to be treated is brackish water. In one embodiment the water to be treated is ground water. In one embodiment the water to be treated is fresh water. In one embodiment the water to be treated is recycled water. In one embodiment the water to be treated is waste water.

As stated above in one embodiment the method involves contacting a membrane of the invention with a feed stream of the water to be treated to form a permeate stream and a retentate stream. The contacting typically occurs under pressure and the methods of achieving this would be well known in the art. As would be appreciated by a skilled worker in the art in the method of the invention the permeate stream thus produced will have a higher level of purity than the feed stream whereas the retentate stream will have a lower level of purity than the feed stream. Put another way the method serves to increase the concentration of impurities in the feed stream so that they are concentrated in the retentate stream.

Examples of materials and methods for use with the process of the present invention will now be provided. In providing these examples, it is to be understood that the specific nature of the following description is not to limit the generality of the above description.

EXAMPLES

The present invention will now be described with reference to the following examples.

Materials:

Bis(4-chlorophenyl) sulfone, bisphenol A, sodium chloride (NaCl), potassium carbonate ($K_2CO_3$), poly(allylamine hydrochloride) (PAH, $M_n$~70000), 30% fuming sulfuric acid, N-methyl-2-pyrolidionone (NMP), N,N-dimethylacetamide (DMA) and toluene were purchased from Sigma-Aldrich and used as received unless specified.

Example 1—Polysulfone Synthesis 4,4-Isopropylidenediphenol (BPA) and 4,4-dichlorodiphenyl sulfone (DCDPS) were both purified by re-crystallisation in toluene. All reagents were dried under vacuum before use. Solvents were used as purchased unless otherwise stated.

Sulfonated monomer was synthesised from the sulfonation of dichlorodiphenyl sulfone. Firstly, 4,4-dichlorodiphenyl sulfone (DCDPS) (28.7 g, 99 mmol) was dissolved in ~60 ml of 30% fuming sulfuric acid under nitrogen atmosphere. The mixture was heated to 110° C. and stirred continuously overnight (10 hrs) under nitrogen to form a homogenous solution. The solution was then cooled to room temperature before an addition of 400 ml of cold water (~0° C.). 180 g of sodium chloride was then added to precipitate 3,3-disulfonated-4,4-dichlorodiphenyl sulfone (SDCDPS) as the disodium salt. The precipitate was filtered and dried before redissolving in 400 ml of cold water. The pH of the solution was adjusted to 6-7 with addition of sodium hydroxide, followed by the addition of 180 g of sodium chloride to re-precipitate the sodium salt form of SDCDPS. The precipitate was filtered and re-crystallized in a heated (50-70° C.) isopropanol/water solution (7/3 v/v). A fine crystalline product was obtained after cooling overnight to room temperature and filtered under vacuum.

The polysulfone was synthesised through the condensation polymerisation of the sulfonated monomer and BPA. In a typical polymerisation, BPA (5 mmol), SDCDPS (5 mmol), potassium carbonate (6 mmol) was added to N-methyl-2-pyrrolidone (~20 ml) in a round bottom flask with a distilling trap, under nitrogen atmosphere and constant stirring. Toluene (~10 ml) was added to the mixture as an azeotroping agent. The solution was heated to 150° C. in an oil bath for 4 hours to remove any presence of water in the system. The toluene was then removed via the distilling trap and the solution temperature was raised to 190° C. at a rate of 5° C./10 min. The polymerisation was allowed to proceed for 48 hours to produce a viscous solution. The polymer solution was diluted with a small amount of dimethylacetamide (~20 ml). The polymer was obtained by pouring the polymer solution into a rapidly stirring large volume of water (~2 L) and allowed to precipitate overnight under constant stirring. The polymer was filtered, dried under vacuum at 120° C. and stored in a sealed container until use. The amount of sulfonation in the sulfonated polysulfone can be altered by using a mixture of DCDPS and SDCDPS in place of purely SDCDPS.

Example 2—Membrane Fabrication

Polyelectrolyte multilayer membranes were assembled on polysulfone substrates (MWCO ~92.5 kDa, A1, GE Water) by spray-assisted assembly. In a typical process, a 10 ml aliquot of PEI aqueous solution (1 mg/ml) was sprayed onto the polysulfone membrane surface to act as a primer layer. Subsequently, alternating layers of polyelectrolyte were deposited by spraying 10 ml aliquots of sulfonated polysulfone (sPSf) followed by poly(allylamine hydrochloride) (PAH) aqueous solutions (1 mg/ml). After each deposition step, a 5 min interval was allowed for polyelectrolyte adsorption, followed by rinsing of excess polyelectrolyte by spraying of the membrane surface with water. This step was repeated a number of time to produce the desired number of bilayers of polyelectrolyte material. Crosslinking of the polyelectrolyte multilayer membranes was performed by immersing the membranes into an aqueous solution of glutaraldehyde of various concentrations (0.025-2.5 M) for 2 h.

Example 3—Membrane Characterisation

Attenuated total reflection Fourier transform infrared (ATR-FTIR) spectra were collected using a Varian 7000 FT-IR spectrometer (Varian, USA). Each spectrum represents an average of 64 measurements obtained at a wavenumber region of 900-4000 $cm^{-1}$ and resolution of 4 $cm^{-1}$. Membrane surface charge was measured using an Anton-Paar Electrokinetic Analyzer (Anton-Paar GmbH, Austria) in a 1 mM NaCl solution at pH values ranging from 6 to 9 as adjusted with NaOH. Each data point represents an average of 4 measurements. The streaming-potential was determined using the Helmholtz-Smoluchowski equation.

For solute rejection and flux experiments, membranes were cut into 14.6 $cm^2$ coupons for insertion into a HP4750 dead-end filtration cell (Sterlitech, USA). All membranes were compacted overnight at ~6900 KPa in Milli-Q water prior to testing. Flux and solute rejection experiments were conducted at 2400 KPa at ambient temperature (20-25° C.). Single salt rejection experiments were conducted on aqueous NaCl (2000 ppm) and $MgCl_2$ (2000 ppm) solutions under constant stirring to prevent concentration polarization. An initial clean water flux test was performed before each salt rejection experiment. The mass of permeate collected over time was recorded using an Ohaus Pioneer balance and the flux was calculated from this mass data.

Crossflow filtration experiments were conducted on a rig consisting of three parallel CF042 cells (Sterlitech, USA). Water flux and salt filtration experiments were conducted on Milli-Q water and NaCl solutions (2000 ppm), respectively at 2400 kPa at ambient temperature (20-25° C.). Mass of permeate was collected over a 30 s time period to calculate flux. Salt rejection was determined from the conductivity of the sample collected. Measurements were repeated 3 times each at 10 min intervals, for 3 replicate samples and averaged for consistency.

The reaction between the amine moieties of PAH and aldehyde in the crosslinking step resulted in the formation of imine (—C═N—) bonds between and within the PAH layers. The conversion of the primary amine (pKa~9) to imine (pKa~4) during the crosslinking also resulted in an increase in the negative charge of the membrane at neutral pH, as shown in the streaming zeta-potential measurements across the membrane surface.

Chemical analysis via ATR-FTIR confirms that imine bond formation occurred within the sPSf/PAH membranes. Interestingly, FTIR analysis also highlights the presence of amine and aldehyde signals after the crosslinking reaction, suggesting that the crosslinking of amine moieties was incomplete. This is attributed to structural densification of the top layers due to the crosslinking reaction inhibiting diffusion of glutaraldehyde deeper into the membrane. Nevertheless, a significant reduction in the free volume within the membrane film was observed after crosslinking, as demonstrated by the drop in membrane flux.

The performance of both the crosslinked and uncrosslinked membranes in separating NaCl and $MgCl_2$ were evaluated using the dead-end filtration apparatus as a function of membrane bilayer number. A steady increase in the rejection of both monovalent NaCl and divalent $MgCl_2$ was observed with an increase in the bilayer number. The low rejection and high flux observed on membranes consisting of 2 bilayers or less is attributed to defects within the films. Subsequently, a steady increase in rejection as a function of bilayer number was observed. A slower rate of increase in both rejection and flux after 6 bilayers could be attributed to reduced diffusion of glutaraldehyde into the increasingly dense film.

In both the uncrosslinked and crosslinked sPSf/PAH films, the rejection of the divalent $MgCl_2$ was observed to be higher than that of the monovalent ions. For the positively charged, uncrosslinked membrane, this is consistent with ion rejection via the Donnan exclusion mechanism. For the negatively charged crosslinked membranes, the higher rejection of divalent cations over monovalent cations indicates that steric effects are dominant, consistent with the rejection mechanisms proposed for densely crosslinked polyamide membranes.

The difference in salt rejection between membranes crosslinked at low and high glutaraldehyde concentrations is small, suggesting that crosslinking is efficient at the membrane surface. The minor differences in rejection are attributed to the increasing diffusion of glutaraldehyde into the membrane bulk at higher concentrations.

Membrane flux was also evaluated in a cross-flow filtration setup to simulate industrial operation conditions. The fluxes of the fabricated PEM membranes were lower than the commercial TFC membranes, with values of 6 $Lm^2$ $hr^{-1}$ for sPSf/PAH membranes formed with 10 bilayers. However, a direct comparison would be misleading given the level of optimization on the commercial membranes to enhance their performance. More importantly, the present system demonstrates the ability of glutaraldehyde crosslinked films in creating membranes exhibiting high monovalent ion rejection (97% for sPSf/PAH membranes in 2000 ppm of NaCl at 2400 kPa). As only the polycation layer contributes to the crosslinking reaction, the system is also significantly more versatile in allowing potentially a wide variety of sulfonated polysulfones to be incorporated into the film without compromising crosslinking density. Alongside the implementation of various optimization techniques reported in the literature, such as the incorporation of polyelectrolyte blends and zeolites, significant improvements in water flux can be foreseen.

To evaluate their chemical stability in the presence of chlorine, the membranes were immersed in a solution of sodium hypochlorite at elevated concentrations (3500 ppm) at pH 8 to accelerate the effect of chlorine degradation on the membranes. The rejection of NaCl thereafter was evaluated as a function of chlorine immersion time (ppm-hr) and compared to a commercial polyamide TFC membrane (DuPont SW30HR). The commercial polyamide membranes exhibited a significant reduction in ion rejection after 5 h of exposure to chlorine. Such observations are consistent with literature values on chlorine degradation of aromatic polyamide RO membranes. The degradation mechanism in aromatic polyamide membrane proceeds via the N-chlorination of the aromatic amine, which ultimately results in polymer chain scission. Chemical analysis of sPSf/PAH membranes showed that no degradation of the imine bonding was observed. sPSf/PAH PEM membranes exhibited marked improvements in chlorine resistance compared to the commercial membrane.

Finally, it will be appreciated that various modifications and variations of the methods and compositions of the invention described herein will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are apparent to those skilled in the art are intended to be within the scope of the present invention.

The invention claimed is:

1. A membrane comprising (a) a water permeable charged substrate and (b) a plurality of polyelectrolyte bilayers deposited on at least one side of the substrate, each polyelectrolyte bilayer comprising a layer of a cationic polyelectrolyte material and a layer of an anionic polyelectrolyte material, wherein the anionic polyelectrolyte material is a sulfonated polysulfone, wherein the charged substrate is a polyethyleneimine treated polysulfone, wherein the cationic polyelectrolyte material is selected from the group consisting of poly(acrylamide-co-diallyldimethyl ammonium chloride), poly(allylamine hydrochloride), and poly(diallyldimethylammonium chloride).

2. A membrane according to claim 1, wherein the cationic polyelectrolyte material is poly(allylamine hydrochloride).

3. A membrane according to claim 2, wherein the poly(allylamine hydrochloride) has a Mn of about 70000.

4. A membrane according to claim 1, wherein the sulfonated polysulfone is a polysulfonated polysulfone.

5. A membrane according to claim 4, wherein the polysulfonated polysulfone contains two sulfonate groups per repeat unit.

6. A membrane according to claim 1, wherein the membrane comprises at least 5 polyelectrolyte bilayers.

7. A membrane according to claim 1, wherein the cationic polyelectrolyte material in one bilayer is cross linked to the cationic polyelectrolyte material in an adjacent bilayer.

8. A membrane according to claim 7, wherein the cationic polyelectrolyte material in one bilayer is cross linked to the cationic polyelectrolyte material in an adjacent layer by a glutaraldehyde residue.

9. A method of forming a membrane, the method comprising the steps of:
(a) providing a charged substrate, wherein the charged substrate is a polyethyleneimine treated polysulfone;
(b) depositing a polyelectrolyte bilayer on at least one side of the substrate, each polyelectrolyte bilayer comprising a layer of a cationic polyelectrolyte material and a layer of an anionic polyelectrolyte material wherein the anionic polyelectrolyte material is a sulfonated polysulfone, wherein the cationic polyelectrolyte material is selected from the group consisting of poly(acrylamideco-diallyldimethyl ammonium chloride), poly(allylamine hydrochloride), and poly(diallyldimethylammonium chloride).

10. A method according to claim 9, wherein step (b) comprises the steps of:
(b1) depositing a layer of cationic polyelectrolyte material;
(b2) washing the deposited layer;
(b3) depositing a layer of anionic polyelectrolyte material, wherein the anionic polyelectrolyte material is a sulfonated polysulfone;
(b4) washing the deposited layer.

11. A method according to claim 9, wherein step (b) comprises the steps of:
(b1) depositing a layer of an anionic polyelectrolyte material, wherein the anionic polyelectrolyte material is a sulfonated polysulfone;
(b2) washing the deposited layer;
(b3) depositing a layer of cationic polyelectrolyte material;
(b4) washing the deposited layer.

12. A method according to claim 9, wherein the cationic polyelectrolyte material is poly(allylamine hydrochloride).

13. A method according to claim 12, wherein the poly(allylamine hydrochloride) has a Mn of about 70000.

14. A method according to claim 9, wherein the sulfonated polysulfone is a polysulfonated polysulfone.

15. A method according to claim 14, wherein the polysulfonated polysulfone contains two sulfonate groups per repeat unit.

16. A method according to claim 9, wherein step b is repeated 5 times.

17. A method according to claim 9, further comprising the step of crosslinking the cationic polyelectrolyte material in at least one bilayer to the cationic polyelectrolyte material in an adjacent bilayer.

18. A method of treating water to increase its purity using a membrane according to claim 1.

19. A method according to claim 18, wherein the method comprises providing a feed stream of water to be treated and contacting the membrane with the feed stream to produce a permeate stream and a retentate stream wherein the permeate stream has a higher level of purity than the feed stream.

* * * * *